United States Patent
Ishikawa

(10) Patent No.: US 10,977,923 B2
(45) Date of Patent: Apr. 13, 2021

(54) RIVER RISK LEVEL DETERMINING DEVICE, RIVER RISK LEVEL DETERMINING METHOD, AND STORAGE MEDIUM

(71) Applicant: NEC Corporation, Tokyo (JP)

(72) Inventor: Masumi Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/767,313

(22) PCT Filed: Nov. 30, 2018

(86) PCT No.: PCT/JP2018/044110
§ 371 (c)(1),
(2) Date: May 27, 2020

(87) PCT Pub. No.: WO2019/107528
PCT Pub. Date: Jun. 6, 2019

(65) Prior Publication Data
US 2020/0410838 A1 Dec. 31, 2020

(30) Foreign Application Priority Data
Dec. 1, 2017 (JP) .............................. JP2017-231933

(51) Int. Cl.
*G08B 21/10* (2006.01)
*G06K 9/62* (2006.01)
(Continued)

(52) U.S. Cl.
CPC ............ *G08B 21/10* (2013.01); *G06K 9/0063* (2013.01); *G06K 9/3233* (2013.01); *G06K 9/6202* (2013.01)

(58) Field of Classification Search
CPC ..... G08B 21/10; G06K 9/0063; G06K 9/3233; G06K 9/6202
(Continued)

(56) References Cited

U.S. PATENT DOCUMENTS 8,229,768 B1 * 7/2012 Hopkins, III .......... G06Q 40/00
705/4
8,542,884 B1 * 9/2013 Maltby, II .......... G06K 9/00476
382/113
(Continued)

FOREIGN PATENT DOCUMENTS

| JP | 2002-256525 A | 9/2002 |
| JP | 2005-149035 A | 6/2005 |

(Continued)

OTHER PUBLICATIONS

International Search Report for PCT Application No. PCT/JP2018/044110, dated Dec. 25, 2018.
(Continued)

*Primary Examiner* — Kerri L McNally

(57) ABSTRACT

According to the present invention, a water region detecting unit (11) detects, in a determination target region set in an input image captured of a river, a water region covered by water. An area ratio calculating unit (12) calculates the ratio of the area of the water region to the area of the determination target region. A risk level determining unit (13) calculates the level of flooding risk of the river on the basis of the calculated ratio.

8 Claims, 12 Drawing Sheets

DETERMINATION TARGET REGION (AREA Sa)   WATER REGION (AREA Sw)

(51) Int. Cl.
*G06K 9/32* (2006.01)
*G06K 9/00* (2006.01)

(58) Field of Classification Search
USPC .......................................................... 340/601
See application file for complete search history.

(56) References Cited

U.S. PATENT DOCUMENTS

| | | | |
|---|---|---|---|
| 2005/0073532 A1* | 4/2005 | Scott | G06Q 10/06 345/634 |
| 2014/0278561 A1* | 9/2014 | Knuffke | G06Q 40/08 705/4 |
| 2014/0304007 A1* | 10/2014 | Kimball | G06Q 40/08 705/4 |
| 2015/0019262 A1* | 1/2015 | Du | G06Q 40/08 705/4 |
| 2017/0083747 A1* | 3/2017 | Guan | G06K 9/0063 |
| 2017/0277815 A1* | 9/2017 | Lorang | G01S 15/58 |

FOREIGN PATENT DOCUMENTS

| | | |
|---|---|---|
| JP | 3701167 B2 | 9/2005 |
| JP | 3907200 B2 | 4/2007 |
| JP | 2007-256254 A | 10/2007 |
| JP | 2009-217725 A | 9/2009 |

OTHER PUBLICATIONS

English translation of Written opinion for PCT Application No. PCT/JP2018/044110, dated Dec. 25, 2018.

B. Scholkopf, K. Sung, C. Burges, F. Girosi, P. Niyogi, T. Poggio, V. Vapnik, "Comparing support vector machines with gaussian kernels to radial basis function classifiers", IEEE Transactions on Signal Processing, vol. 45, No. 11, Nov. 1997, pp. 2758 to 2765, USA.

Jonathan Long, Evan Shelhamer, Trevor Darrell,"Fully Convolutional Networks for Semantic Segmentation", "2015 IEEE Conference on Computer Vision and Pattern Recognition (CVPR)", DOI: 10.1109/CVPR.2015.7298965, Oct. 15, 2015, USA.

* cited by examiner

CASE OF RECTANGULAR REGION

POSITION INFORMATION
(x1, y1) (x2, y2) (x3, y3) (x4, y4)

DETERMINATION TARGET REGION

CASE OF ARBITRARY SHAPE

DETERMINATION TARGET REGION

CASE OF RECTANGULAR REGION INCLUDING NON-DETERMINATION TARGET REGION

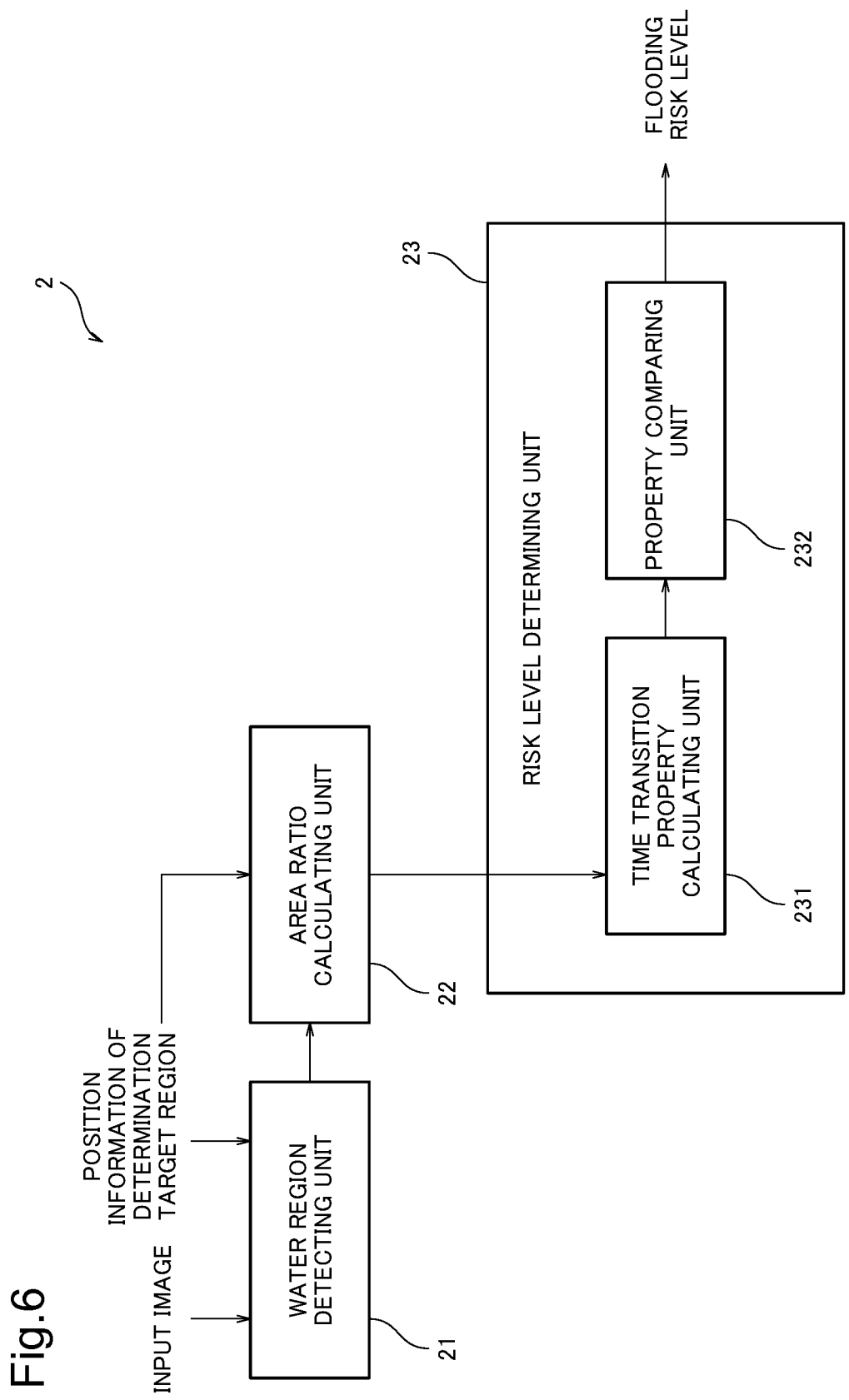

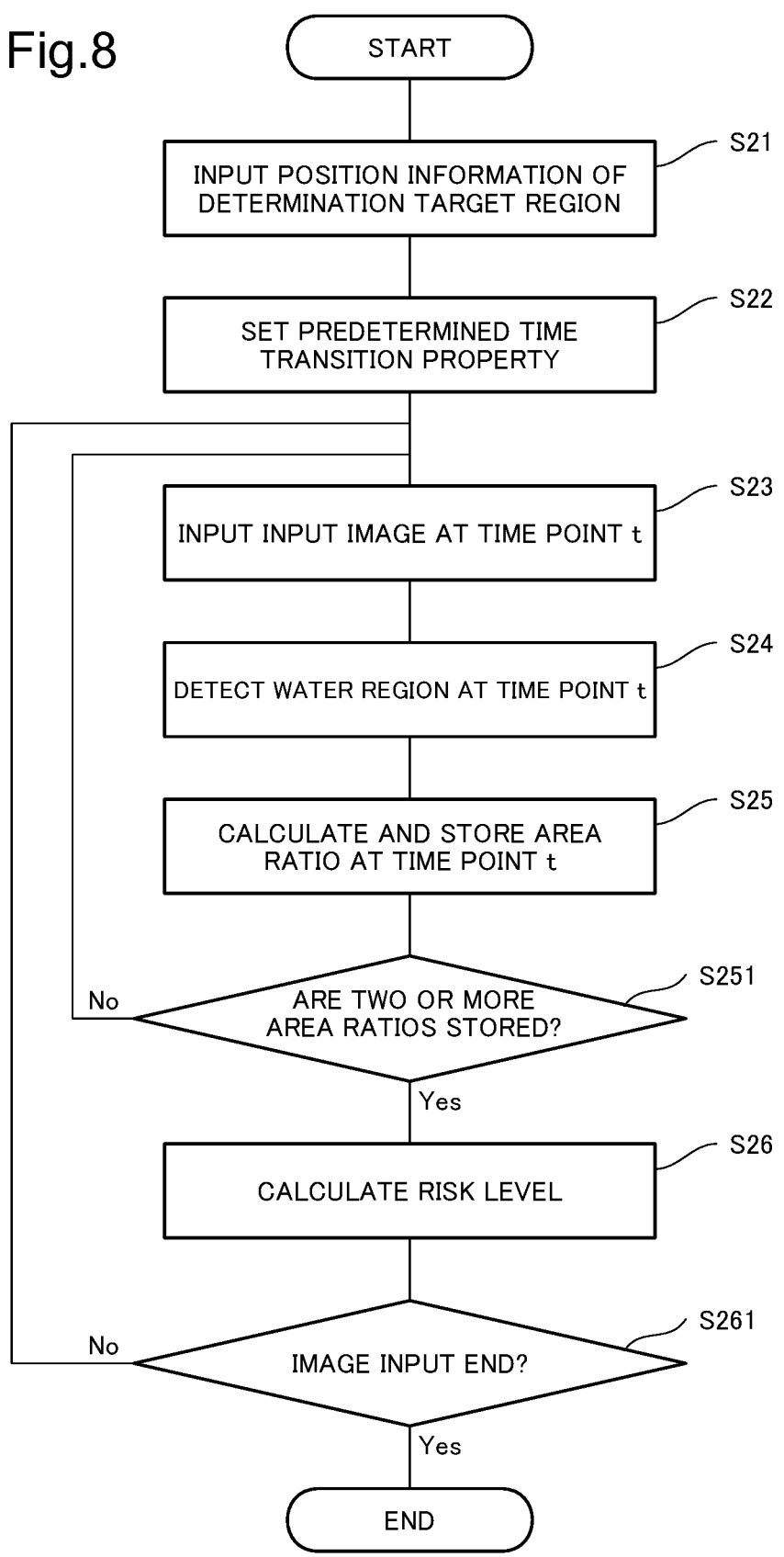

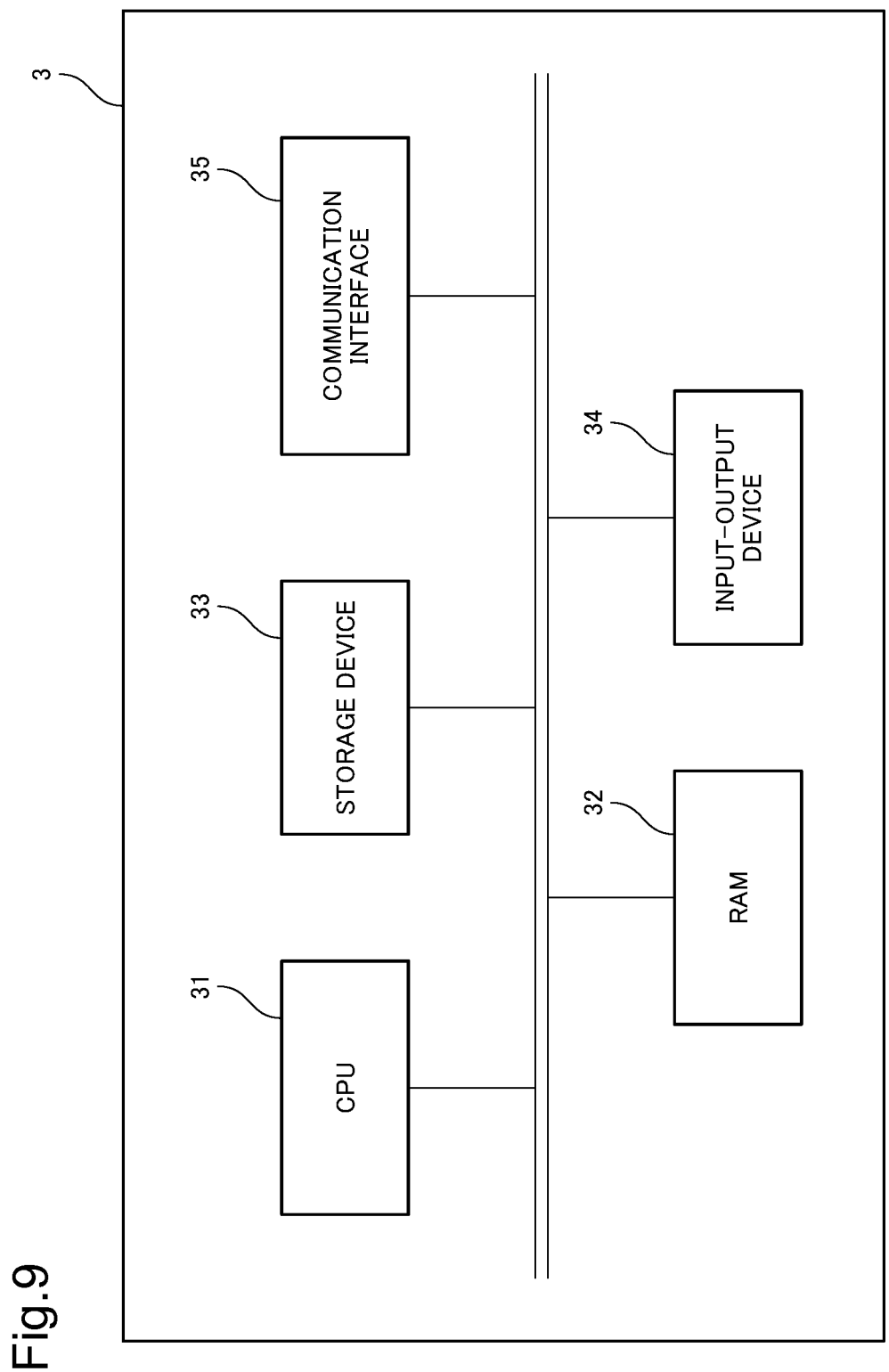

RIVER RISK LEVEL DETERMINING DEVICE, RIVER RISK LEVEL DETERMINING METHOD, AND STORAGE MEDIUM

This application is a National Stage Entry of PCT/JP2018/044110 filed on Nov. 30, 2018, which claims priority from Japanese Patent Application 2017-231933 filed on Dec. 1, 2017, the contents of all of which are incorporated herein by reference, in their entirety.

TECHNICAL FIELD

The present invention relates to a river risk level determining device, a river risk level determining method, and a storage medium, and particularly relates to a river risk level determining device that determines risk of river flooding from a captured image of a river.

BACKGROUND ART

In recent years, river flooding has occurred frequently throughout the country due to climate change. In order to minimize damage caused by such river flooding, there is a demand for a device or system capable of determining a possibility of flooding before river flooding occurs.

In a related technique, when a water level of a river exceeds an altitude set in advance, it is determined that there is risk of flooding. In this technology, a water level needs to be detected.

In a river office under jurisdiction of the Ministry of Land, Infrastructure, Transport and Tourism, a measuring device such as a hydraulic water level gauge and a water-level gauging board is used for detecting a water level. The hydraulic water level gauge mechanically measures change in water pressure received by a pressure receiving unit installed in water. There is also a method of visually confirming a water level indicated by the water-level gauging board installed in a river. However, in either method, there is a possibility that the measuring device is washed away at a time of river rising. In addition, deploying measuring devices in all of 60,000 or more rivers in the whole country is costly and time consuming.

In view of the above, a method of determining a water level by analyzing video of a monitoring camera installed in a river has been proposed. A water level detecting device disclosed in PTL 1 determines a water level, based on a property that a luminance value greatly attenuates at a water surface boundary. Specifically, pixels in a region at the same altitude are extracted from video captured by a monitoring camera, and average luminance of the extracted pixels is calculated. Then, an altitude at which the luminance sharply attenuates is determined as a water level. By comparing the water level determined thereby with a predetermined threshold value, the water level detecting device calculates flooding risk.

CITATION LIST

Patent Literature

[PTL 1] Japanese Patent No. 3907200
[PTL 2] Japanese Patent No. 3701167
[PTL 3] Japanese Unexamined Patent Application Publication No. 2009-217725

Non Patent Literature

[NPL 1] B. Scholkopf, K. Sung, C. Burges, F. Girosi, P. Niyogi, T. Poggio, V. Vapnik, "Comparing support vector machines with gaussian kernels to radial basis function classifiers", IEEE Trans. Sign. Processing, Vol. 45, pp. 2758 to 2765, 1997.
[NPL 2] Jonathan Long, Evan Shelhamer, Trevor Darrell, "Fully Convolutional Networks for Semantic Segmentation", "2015 IEEE Conference on Computer Vision and Pattern Recognition (CVPR)", DOI: 10.1109/CVPR.2015.7298965, 15 Oct. 2015.

SUMMARY OF INVENTION

Technical Problem

However, in the above-described related art, there is a problem that it is difficult to determine a flooding risk in a place, such as a downstream area of a river, where an altitude difference between a water surface and an embankment at normal time is small. The reason is that, in a place where an altitude difference between a water surface and an embankment at normal time is small, even when fluctuation of a water level is small (e.g., several centimeters to several tens of centimeters), a possibility of flooding occurrence greatly changes.

An object of the present invention is to provide a device that can determine a risk of river flooding even in a place where an altitude difference between a water surface and an embankment is small.

Solution to Problem

A water level risk level determining device according to one aspect of the present invention includes: a water region detecting unit that detects a water region covered with water, in a determination target region being set on an input image, the input image being a captured image of a river; an area ratio calculating unit that calculates an area ratio being a proportion of an area of the water region to the determination target region; and a risk level determining unit that determines, based on the area ratio, a risk level indicating a height of a risk of flooding of the river.

A water level risk level determining method according to one aspect of the present invention includes: detecting a water region covered with water, in a determination target region being set on an input image, the input image being a captured image of a river; calculating an area ratio being a proportion of an area of the water region to the determination target region; and calculating, based on the area ratio, a risk level indicating a height of a risk of flooding of the river.

A storage medium according to one aspect of the present invention stores a program for causing a computer to execute: detecting a water region covered with water, in a determination target region being set on an input image, the input image being a captured image of a river; calculating an area ratio being a proportion of an area of the water region to the determination target region; and calculating, based on the area ratio, a risk level indicating a height of a risk of flooding of the river.

Advantageous Effects of Invention

According to the present invention, even in a place where an altitude difference between a water surface and an embankment is small, a risk of river flooding can be determined.

BRIEF DESCRIPTION OF DRAWINGS

FIG. 6 is a block diagram illustrating a configuration of the river risk level determining device according to the first example embodiment.

FIG. 8 is a flowchart illustrating operation of a river risk level determining device according to a second example embodiment.

FIG. 9 is a diagram illustrating a hardware configuration of the river risk level determining device according to a third example embodiment.

EXAMPLE EMBODIMENT

Hereinafter, example embodiments of the present invention are described in detail with reference to the drawings.

First Example Embodiment (Configuration of River Risk Level Determining Device 1)

Figure 1:
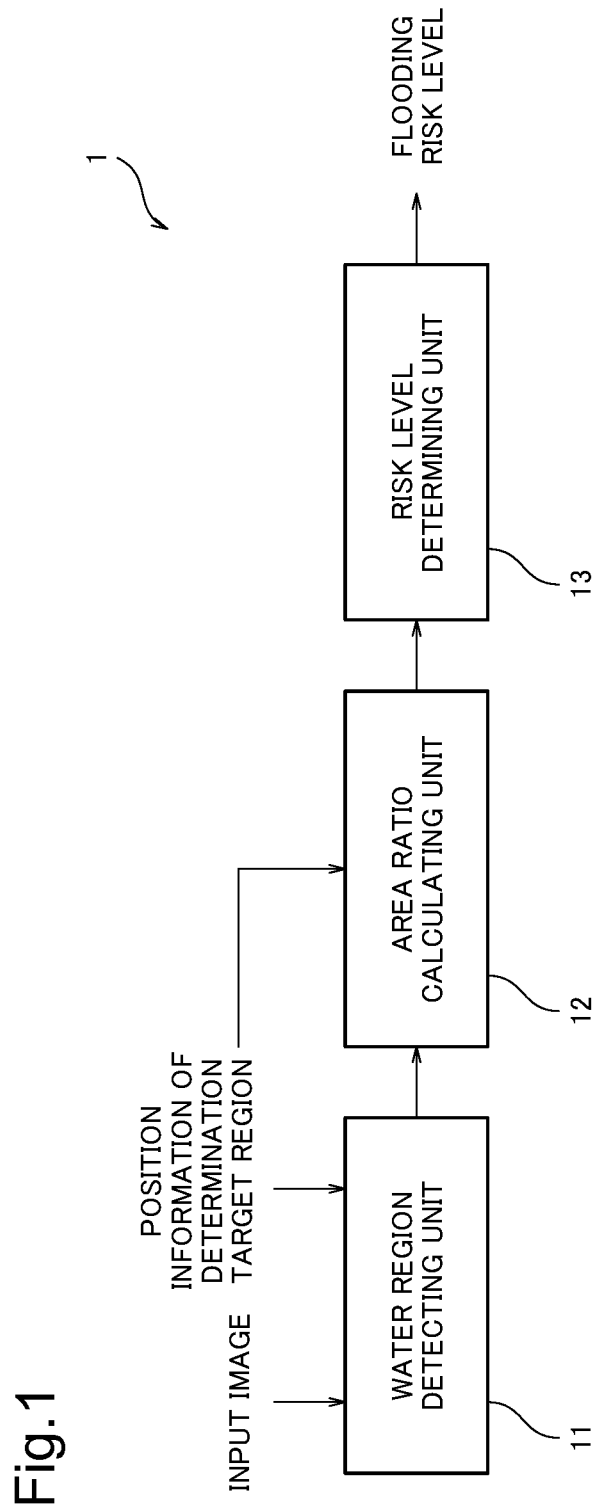
FIG. 1 is a block diagram illustrating a configuration of a river risk level determining device according to a first example embodiment.

FIG. 1 is a block diagram illustrating a configuration of a river risk level determining device 1 according to a first example embodiment. As illustrated in FIG. 1, the river risk level determining device 1 includes a water region detecting unit 11, an area ratio calculating unit 12, and a risk level determining unit 13. The river risk level determining device 1 acquires, as an input image (refer to FIG. 3), one frame of video captured by a monitoring camera or the like (refer to (a) and (b) in FIG. 2). Then, based on a proportion (referred to as an area ratio) of an occupied region (referred to as a water region) covered with water in relation to a preset region (referred to as a determination target region) in the input image, the river risk level determining device 1 calculates a risk level representing a height of a possibility that a river floods. The determination target region, the water region, the area ratio, and the risk level are described below by citing specific examples.

(Installation of Monitoring Camera and Input Image)

Figure 2:
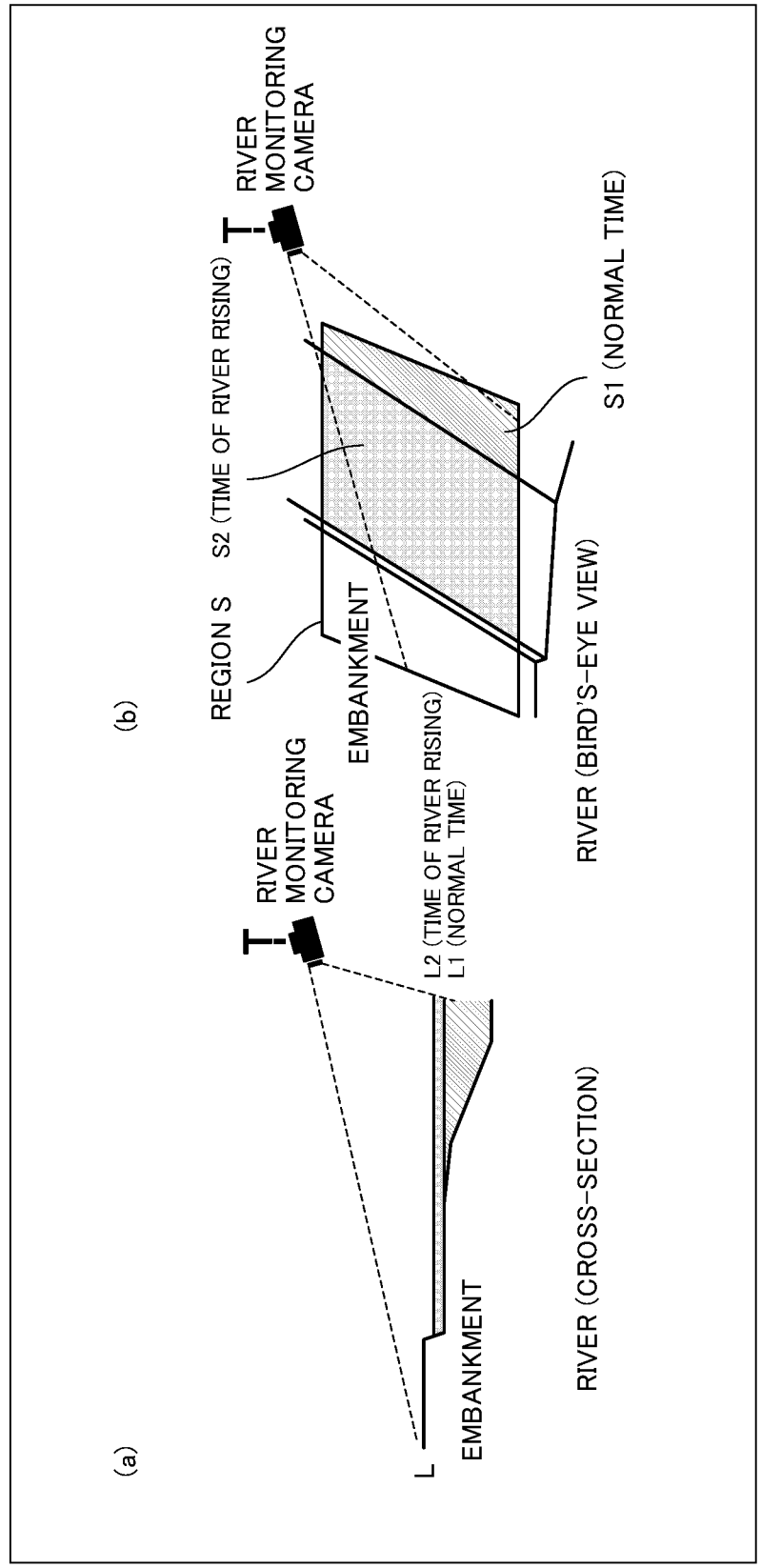
FIG. 2 is a diagram illustrating a river for which a monitoring camera is installed.

In FIG. 2, (a) is a cross-sectional view of a river where a monitoring camera (one example of a river monitoring camera) is installed, and (b) is a bird's-eye view of a river where the monitoring camera (one example of a river monitoring camera) is installed.

In (a) of FIG. 2, an altitude of a water surface of the river at normal time (i.e., when a river is not rising) is designated by "L1", and a water level of the river at time of river rising is designated by "L2". An altitude at the top of an embankment is "L" (>L1). An altitude difference between a water surface and the embankment at the normal time is L–L1, and an altitude difference between a water surface and the embankment at the time of river rising is L–L2. When a water level L2 at the time of river rising reaches the altitude L of the embankment, i.e., in the case of L2=L, there is a possibility that the river floods over the embankment.

In (b) of FIG. 2, a flow region of the river at the normal time is designated by "S1", and a flow region of the river at the time of river rising is designated by "S2". A region whose video is captured by the monitoring camera is designated by "S". The region S includes the flow region S1 of the river at the normal time, the flow region S2 of the river at the time of river rising, and a part of the embankment. At the normal time, the flow region S1 of the river is apart from the embankment, but at the time of river rising, a flow region of the river expands and comes into contact with the embankment. When the river floods, the region S is covered with the flow region S2 of the river.

By wireless or wired communication, the monitoring camera transmits, to the river risk level determining device 1, as the input image, video data acquired by capturing video of the region S.

Figure 3:
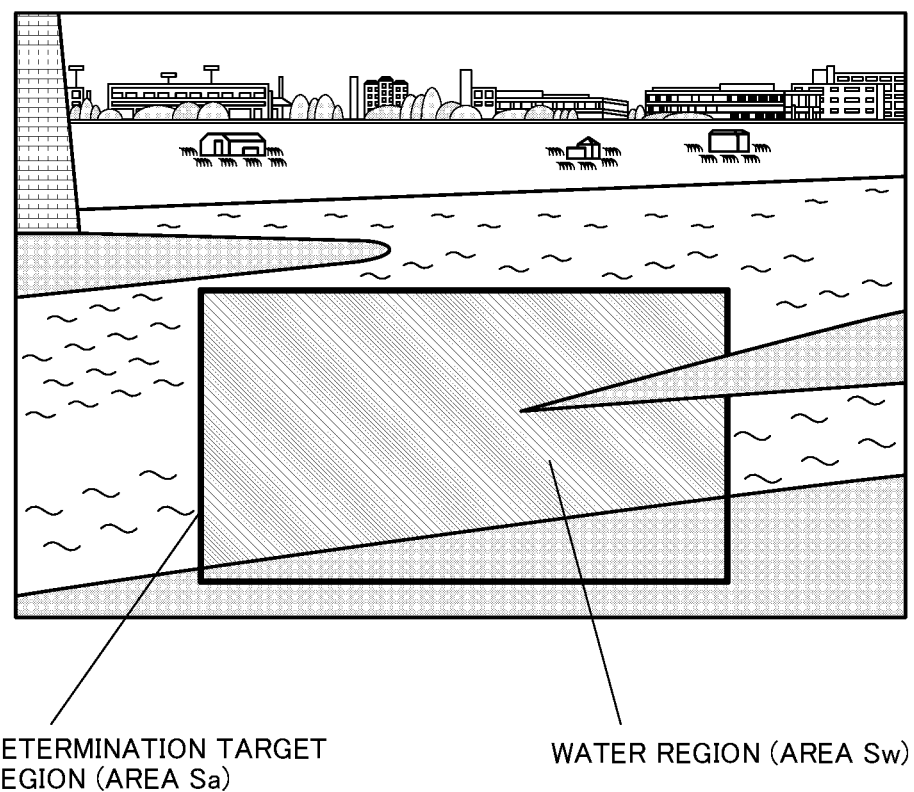
FIG. 3 is a diagram illustrating an input image extracted from video captured by the monitoring camera.

FIG. 3 is a diagram illustrating one example of the input image acquired by the river risk determining device 1 from the monitoring camera. As illustrated in FIG. 3, the determination target region is set in the input image.

The determination target region includes at least a region of a river (one example of a water region) and a region that is inside the embankment and is not a river (one example of a non-water region, for example, a riverbank). In FIG. 3, the water region is hatched. A region that is the determination target region excluding the water region is a non-water region. A position and a shape of the determination target region may be set by a user manually or via remote operation.

In the input image illustrated in FIG. 3, an area of the determination target region surrounded by the rectangular frame is represented by "Sa", and an area of the water region indicated by the hatching in the frame is represented by "Sw". The above-described area ratio (=an area of the water region/an area of the determination target region) is Sw/Sa. The area Sa of the determination target region and the area Sw of the water region are represented by the numbers of pixels on the input image that correspond to the determination target region and the water region.

(Examples of Determination Target Region)

Figure 4A:
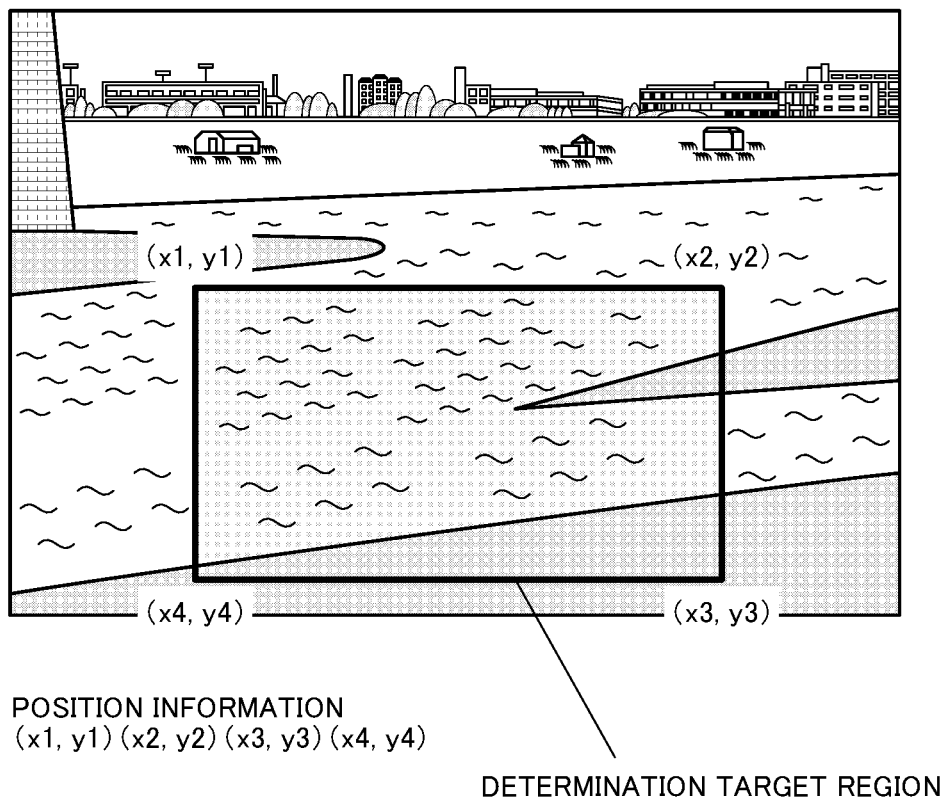
FIG. 4A is a diagram illustrating a first example of a determination target region set in an input captured image of a river.
Figure 4B:
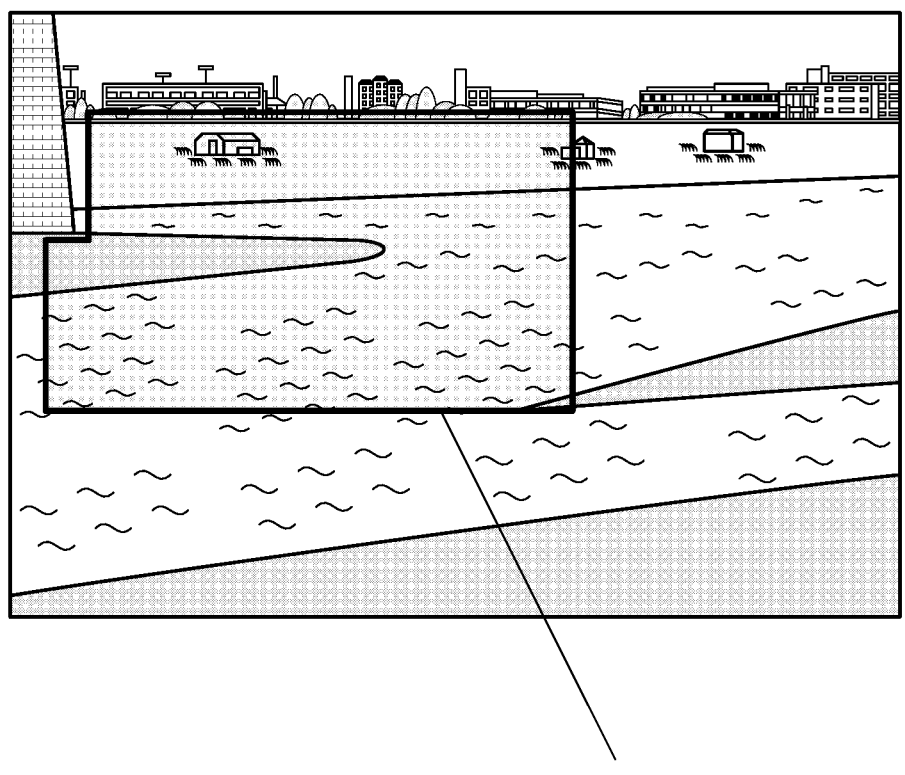
FIG. 4B is another diagram illustrating a second example of a determination target region set in an input captured image of a river.
Figure 4C:
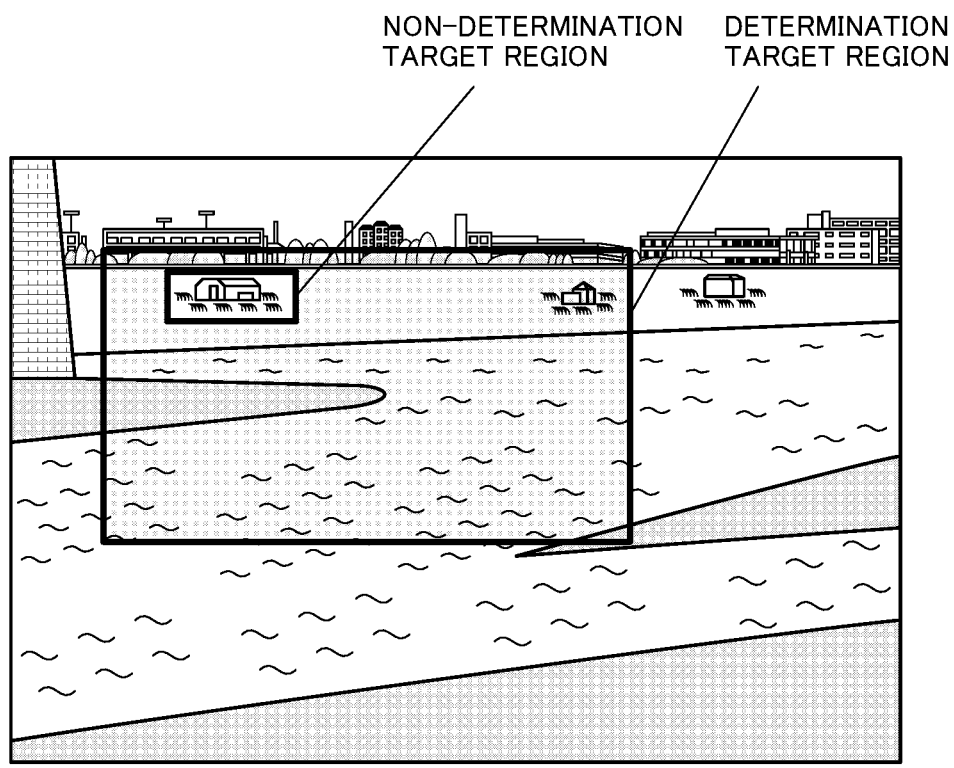
FIG. 4C is another diagram illustrating an example of a determination target region set in an input captured image of a river.

With reference to FIG. 4A to FIG. 4C, the following describes specific examples of the determination target region set in the input image. However, positions and shapes of the determination target region described below are merely examples. A position of the determination target region is determined in such a way that at least a water region and a non-water region are included therein. There is no limitation on a shape of the determination target region.

As illustrated in FIG. 4A, the determination target region in the input image may be rectangular. In this case, position information of the determination target region may be represented by coordinates ((x1, y1) to (x4, y4)) indicating the four corners of the rectangle. Alternatively, position information of the determination target region can be represented by coordinates of some of the four corners, or by a coordinate of the center of the determination target region and a height and a width of the determination target region.

As illustrated in FIG. 4B, the determination target region in the input image may have an uneven shape surrounded by n straight lines (line segments). Each of the line segments may be represented by coordinates ((xm−1, ym−1) and (xm, ym): (m=1 to n)) at the both ends. Alternatively, although not illustrated, the determination target region may be partially or entirely surrounded by a curved line. In this case, the determination target region may be specified by a coordinate indicating a position where a straight or curved line intersects with another straight or curved line.

As illustrated in FIG. 4C, the determination target region in the input image may be set as one having a shape that excludes a region (non-determination target region) unlikely to be covered with water even at time of river rising. Examples of the region unlikely to be covered with water even at the time of river rising include a region of a high-altitude sandbank or a bridge pier and an undulated region (e.g., a lower part of a bank) where plants are growing. In this case, in addition to position information specifying the determination target region, position information specifying the non-determination target region is also necessary. Alternatively, the determination target region may be specified by a coordinate list of all the pixels constituting the determination target region. In this case, position information for the non-determination target region is unnecessary.

(Comparison with Prior Art)

With reference to (a) and (b) of FIG. 2, the following describes the reason why the river risk level determining device 1 according to the present example embodiment can determine a height (one example of the risk level) of a possibility of flooding, more accurately than the related technique.

The related technique (PTL 1) determines a height of a possibility of river flooding, based on an amount of change in water surface between normal time and time of river rising. In (a) of FIG. 2, L2−L1 is an amount of change in water surface between normal time and time of river rising.

However, an amount (L2−L1) of change in water surface between normal time and time of river rising is generally several meters. In contrast, one side of the region S whose video is captured by the monitoring camera has a length of an order of approximately 10 m to 100 m, and is larger than an amount (L2−L1) of change in water surface. Since the input image is acquired by capturing video of the region S, change in input images based on change in water level between normal time and time of river rising is slight. For this reason, it is difficult for the related technique to determine, with high accuracy, a height of a possibility of river flooding, based on an amount (L2−L1) of change in water surface.

As illustrated in (b) of FIG. 2, a flow region of a river at normal time is S1. Meanwhile, a flow region of the river at time of river rising spreads to S2 (>S1). As a result of this, an area ratio (Sw/Sa) that is a proportion of an area Sw of a water region in relation to an area Sa of the determination target region changes. Based on the area ratio (Sw/Sa), the river risk level determining device 1 according to the present example embodiment calculates a risk level of flooding.

Particularly, in a downstream region of a river, a width of the river greatly changes at time of river rising, and thus, change in the area ratio (Sw/Sa) is also large. Accordingly, based on a change amount of an area ratio in the input image, the river risk level determining device 1 can calculate, with high accuracy, the risk level indicating a height of a possibility that the river floods.

(1-1) Water Region Detecting Unit 11

At time point t, the water region detecting unit 11 acquires the input image from the monitoring camera, and acquires information (referred to as position information) concerning a position and a shape of the determination target region preset in the input image. Then, the water region detecting unit 11 detects a water region from an inside of the determination target region, and outputs a detection result to the area ratio calculating unit 12. The detection result here is position information of pixels belonging to the detected water region. The detection result may be represented by a coordinate list of pixels determined to be the water region, or may be represented by data in a format based on another method.

The water area detecting unit 11 may detect a water region by using any method. Examples cited as a method of detecting a water region include a method using a support vector machine (SVM) (NPL 1) and a method based on deep learning (NPL 2). According to these techniques, there are two stages that are a learning phase performed in advance and a discrimination phase of processing the input image.

In an SVM, the water region detecting unit 11 first prepares an image set of two kinds that are a captured image of water and a captured image of non-water. In the learning phase, from each image of the prepared image set, a first image characteristic amount such as a color histogram and an edge histogram is extracted, and the extracted first image characteristic amount is input to a discriminator. Thereby, the discriminator capable of discriminating a pixel into water or non-water is configured. In the discrimination phase, the water region detecting unit 11 divides the determination target region in the input image into fine image patches, and extracts a second image characteristic amount from each image patch. Then, the second image characteristic amount is input to the discriminator generated in the learning phase, and thereby, the discriminator discriminates whether each image patch is one of a captured image of water. An aggregation of image patches discriminated into water by the discriminator is determined as a water region.

In a method based on deep learning, the water region detecting unit 11 first prepares an image set in which a water region and a non-water region is labeled for each pixel. In the learning phase, the water region detecting unit 11 inputs a learning set of the image data to a multilayer neural network, and learns weights of the neural network in such a way that each pixel is determined as water or non-water in accordance with the label. In the discrimination phase, the water region detecting unit 11 inputs the input image to the neural network in which learning has been made, and discriminates whether each pixel in the determination target region in the input image is a pixel related to water or a pixel related to non-water. Then, the water region detecting unit 11 determines, as a water region, an aggregation of pixels discriminated into water.

In order to improve accuracy of detecting a water region, the water region detecting unit 11 may, before detecting a water region, correct contrast of the input image sharpen a contour (sharpening processing), correct color balance, and/or perform processing (de-noise processing) of suppressing noise. For example, the water region detecting unit 11 may perform pre-processing for removing, from the input image, influence caused by fog frequently occurring in a river, backlight and a shadow occurring depending on a sunlight condition, darkness of nighttime, overdyeing caused by a color of an electric light, and the like. Alternatively, the water region detecting unit 11 may perform, on the input image, pre-processing for reducing noise of a sensor of the monitoring camera. Thereby, the water region detecting unit 11 can stably detect a water region.

(1-2) Area Ratio Calculating Unit 12

The area ratio calculating unit 12 acquires, as input, a detection result of a water region in the input image at a time point t and position information of the determination target region preset. Then, the area ratio calculating unit 12 calculates the area ratio indicating a proportion of an area of a water region in relation to the determination target region. The area ratio calculating unit 12 outputs a result of the calculated area ratio to the risk level determining unit 13.

Specifically, the area ratio calculating unit 12 can calculate an area ratio Rw at a time point t by the following equation (1). In the equation (1), Sa is an area of the determination target region, and Sw is an area of a water region (refer to FIG. 3).

$$Rw = Sw/Sa \qquad \text{Equation (1)}$$

(1-3) Risk Level Determining Unit 13

By comparing an area ratio calculated for the input image at a time point t with a predetermined threshold value of an area ratio, the risk level determining unit 13 calculates the risk level indicating a height of a possibility that a river floods. Calculating the risk level of flooding includes not only calculating a numeric value itself indicating the risk level, but also determining whether the risk level is high or low. The risk level determining unit 13 outputs the calculation result of the risk level to an external device (e.g., a display) or the like.

The risk level determining unit 13 previously acquires data of predetermined reference value and threshold value of an area ratio that are criteria for determining the risk level. The predetermined reference value of the area ratio may be an area ratio at normal time of a river, or may be an area ratio (i.e., 1) when the entire determination target region is covered with water. Alternatively, the reference value of the area ratio may be an area ratio between a region formed by excluding, from the determination target region, a region that is not covered with water even at time of river rising and the entire determination target region. Alternatively, the risk level determining unit 13 may use one or a combination of the above, as the predetermined reference value of the area ratio.

The risk level determining unit 13 sets, as a predetermined threshold value of the area ratio, an area ratio for which the risk level of river flooding is empirically determined as being high. Alternatively, the risk level determining unit 13 may set a plurality of predetermined threshold values of the area ratio in consideration of time necessary for evacuation guidance or the like at time of flooding. In this case, a plurality of the threshold values represent different risk levels. As a threshold value increases, a corresponding risk level (i.e., a height of a possibility that flooding occurs) increases.

The risk level determining unit 13 determines the risk level, based on a relative value (e.g., a ratio) or a magnitude relation between an area ratio calculated for the input image at a time point t and a predetermined threshold value of the area ratio.

It is assumed that the area ratio calculated for the input image at a time point t is Rw, and a predetermined threshold value of the area ratio is THrh. A predetermined reference value of the area ratio for assumed normal time or an assumed case where an amount of water in a river is small is set as THrl (THrl<Rw<THrh). In this case, the risk level determining unit 13 may calculate the risk level DR in accordance with the following equation (2), for example.

$$DR = (Rw - THrl)/(THrh - THrl) \qquad \text{Equation (2)}$$

The equation (2) represents how much the area ratio Rw in the input image deviates from the reference value THrl and how much the area ratio Rw is close to the threshold value THrh. The reference value THrl is the area ratio at normal time of a river. Accordingly, as the area ratio Rw is closer to the reference value THrl, a possibility that flooding occurs is smaller (i.e., the risk level is "lower"). Meanwhile, as the area ratio Rw is closer to the threshold value THrh, a possibility that flooding occurs is higher (i.e., the risk level is "higher").

Alternatively, a plurality of threshold values (n number of THr1, . . . , and THrn) may be set in stages. In this configuration, the risk level determining unit 13 can determine the risk level DR in (n+1) stages in accordance with the equation (3) expressed below. A user may manually input n predetermined threshold values of the area ratio indicated in the equation (3) by taking, into consideration, time necessary for evacuation guidance or the like at the time of flooding, for example. Thereby, for example, it is possible to implement a configuration in which a level of an alarm is raised each time the risk level DR rises.

$$\begin{aligned}DR = {} & \text{risk level } 0 \text{ (if } Rw < THr1) \\ & \text{risk level } 1 \text{ (if } THr1 \leq Rw < THr2) \\ & \ldots \\ & \text{risk level } n-1 \text{ (if } THrn-1 \leq Rw < THrn) \\ & \text{risk level } n \text{ (if } THrn \leq Rw)\end{aligned} \qquad \text{Equation (3)}$$

(Description of Operation)

Figure 5:
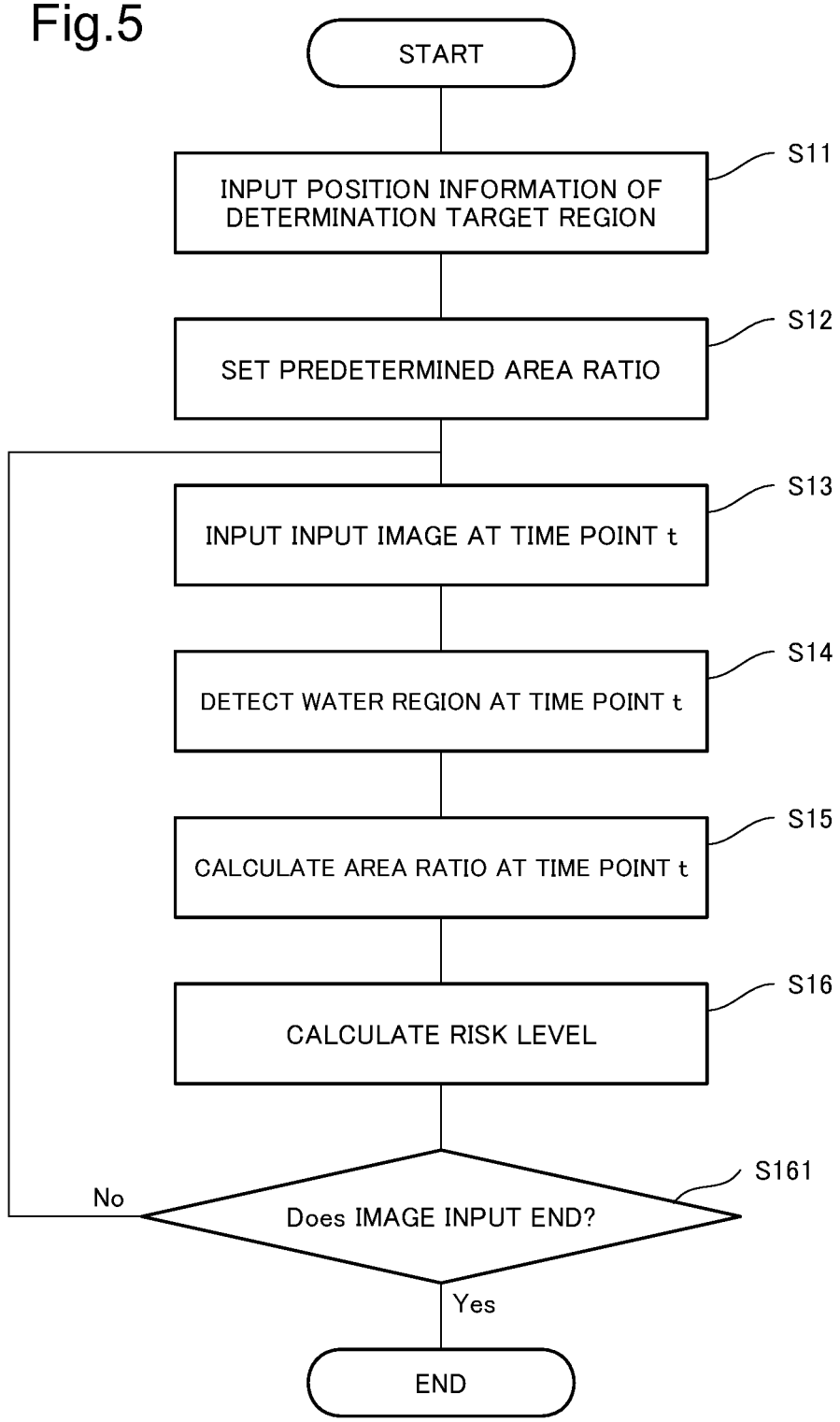
FIG. 5 is a flowchart illustrating operation of the river risk level determining device according to the first example embodiment.

With reference to FIG. 5, the following describes operation of the river risk level determining device 1 according to the present example embodiment. FIG. 5 is a flowchart illustrating a flow of the operation of the river risk level determining device 1.

As illustrated in FIG. 5, position information of the determination target region is supplied to the area ratio calculating unit 12 (step S11). The position information of the determination target region may be input by a user, or may be preset. A reference value and a threshold value that are predetermined area ratios are set (step S12).

Next, at a time point t, one frame of video data captured by the monitoring camera (refer to (a) and (b) of FIG. 2) installed in a river is input as the input image to the water region detecting unit 11 (step S13). The water region detecting unit 11 extracts the determination target region from the input image by using the position information of the determination target region, and detects a water region from the extracted determination target region (step S14). Then, the water region detecting unit 11 outputs position information of the detected water region to the area ratio calculating unit 12.

The area ratio calculating unit 12 calculates the area ratio (=(an area of the water region)/(an area of the determination target region)) by using the position information of the determination target region and the position information of the water region input from the water region detecting unit 11 (step S15). The area ratio calculating unit 12 outputs information of the calculated area ratio to the risk level determining unit 13.

The risk level determining unit 13 calculates the risk level (refer to the equation (2) or the equation (3)) of river flooding, based on a magnitude relation or a relative value (ratio) between the area ratio calculated by the area ratio calculating unit 12 and a predetermined threshold value of the area ratio (step S16). The river risk level determining device 1 repeats the processing of the steps S13 to S16 until image input is ended (Yes at S161). The end of the image input may be determined by a user, based on a river condition, weather, and the like.

(Description of Advantageous Effects)

According to the configuration of the present example embodiment, based on a proportion of an area of an occupied region (referred to as a water region) covered with water in relation to the determination target region, a height of a possibility of river flooding is calculated. For this reason, a height of the risk level can be determined with high accuracy in a zone where a region having the same altitude is wide and an area covered with water greatly fluctuates even when a water level fluctuates slightly, as in a downstream region of a river.

Second Example Embodiment

A river risk level determining device according to the present example embodiment determines a height of a possibility by paying attention to change in area ratio (=an area of a water region/an area of a determination target region) in the input image.

(Configuration of River Risk Level Determining Device 2)

With reference to FIG. 6, the following describes a configuration of the river risk level determining device 2 according to the present example embodiment. FIG. 6 is a block diagram illustrating the configuration of the river risk level determining device 2. As illustrated in FIG. 6, the river risk level determining device 2 includes a water region detecting unit 21, an area ratio calculating unit 22, and the risk level determining unit 23.

A configuration and operation of the water region detecting unit 21 is similar to that of the water region detecting unit 11 of the first example embodiment. A configuration and operation of the area ratio calculating unit 22 is similar to that of the area ratio calculating unit 22 of the first example embodiment. Accordingly, in the present example embodiment, description of the water region detecting unit 21 and the area ratio calculating unit 22 is omitted.

Meanwhile, a configuration of the risk level determining unit 23 is different from that of the risk level determining unit 13 of the first example embodiment. As illustrated in FIG. 6, the risk level determining unit 23 includes a time transition property calculating unit 231 and a property comparing unit 232.

(2-1) Time Transition Property Calculating Unit 231

The time transition property calculating unit 231 holds information of an area ratio calculated for the input image before a time point t. The time transition property calculating unit 231 calculates a time transition property of the area ratio by comparing the area ratio at the time point t calculated by the area ratio calculating unit 22 with the area ratio calculated before the time point t. An area ratio time transition property is a numeric value representing how much the area ratio changes in a period from a certain time point before the time point t to the time point t. In other words, the time transition property represents a time change amount of the area ratio. The time transition property calculating unit 231 outputs information of the calculated time transition property to the property comparing unit 232.

With reference to FIG. 7A to FIG. 7D, the following describes specific examples of a time transition property of the area ratio. The time transition property calculating unit 231 can calculate a time transition property of the area ratio by using any of the below-described methods, for example.

(a) The Case where One Area Ratio is Held

Figure 7A:
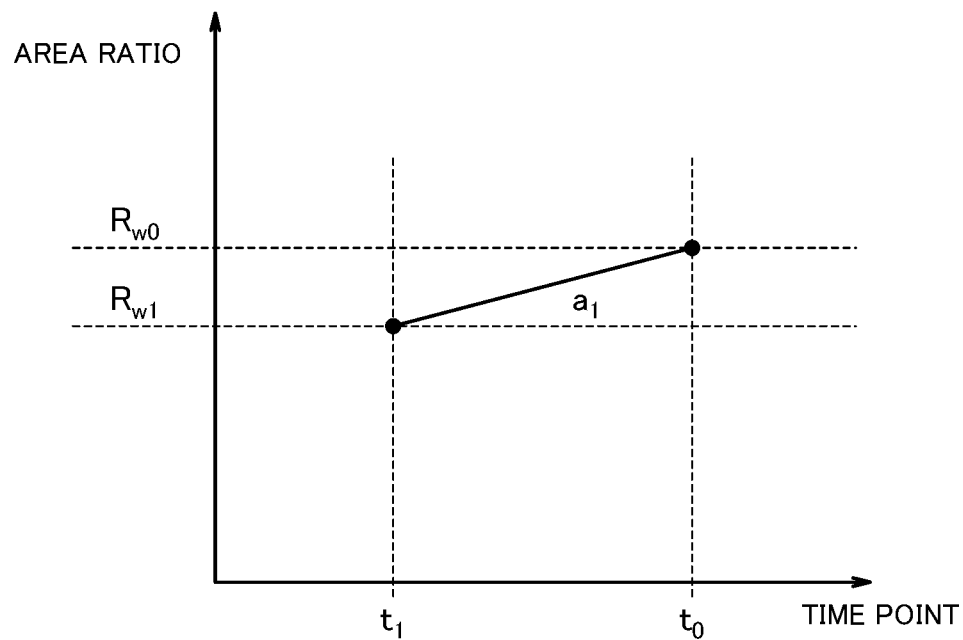
FIG. 7A is a diagram illustrating a first example of time transition of an area ratio (a water region/a determination target region).

A time transition property of the area ratio may be an increase amount of the area ratio in an interval (referred to as unit time) between two time points. For example, it is assumed that as illustrated in FIG. 7A, area ratios at a time point $t_1$ and a time point $t_0$ ($>t_1$) are $R_{w1}$ and $R_{w0}$, respectively. In this case, a time transition property $a_1$ can be calculated in accordance with the following equation (4).

$$a_1 = (R_{w0} - R_{w1})/(t_0 - t_1) \qquad \text{Equation (4)}$$

(b) The Case where Two or More Area Ratios are Held (Transition of the Increase Amount)

Figure 7B:
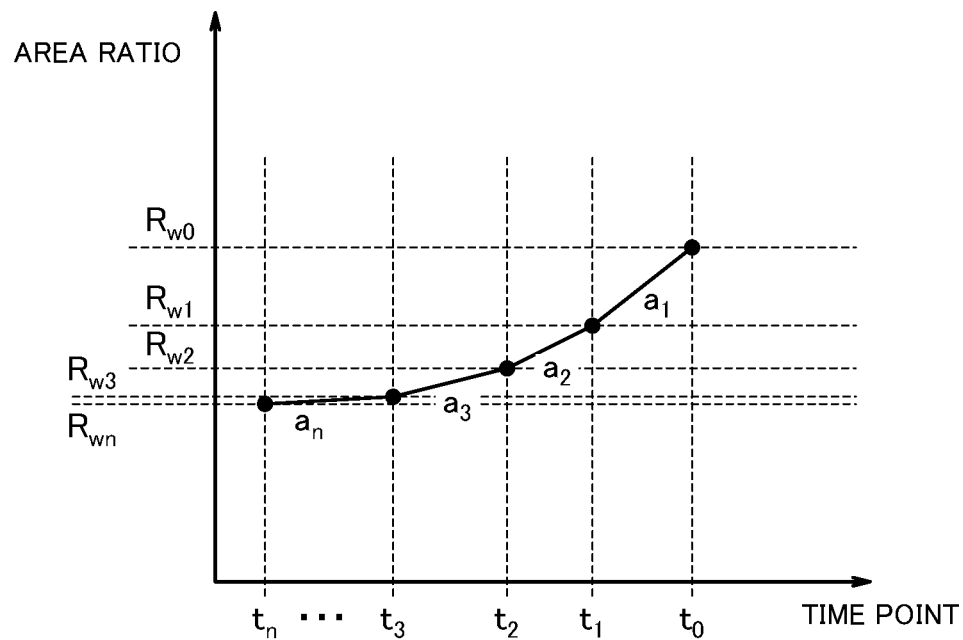
FIG. 7B is a diagram illustrating a second example of time transition of an area ratio (a water region/a determination target region).

A time transition property of the area ratio may be a characteristic vector constituted of time-series data of the increase amount of the area ratio per unit time. For example, it is assumed that as illustrated in FIG. 7B, area ratios at time points $t_n$ to $t_0$ are $R_{wn}$ to $R_{w0}$. In this case, a time transition property a can be calculated in accordance with the following equations (4') and equation (5). In the equation (4'), "$R_{wj}$" is the area ratio at a time point $t_j$ (j=0, 1, 2, . . . , n). A relation of $t_n < t_{n-1} \ldots < t_1 < t_0$ is satisfied.

$$a_j = (R_{wj-1} - R_{wj})/(t_{j-1} - t_j) \ (j=1,2 \ldots ,n) \qquad \text{Equation (4')}$$

$$a = (a_1, a_2, a_3, \ldots, a_n) \qquad \text{Equation (5)}$$

(c) The Case where Two or More Area Ratios are Held (Transition of Area Ratio)

Figure 7C:
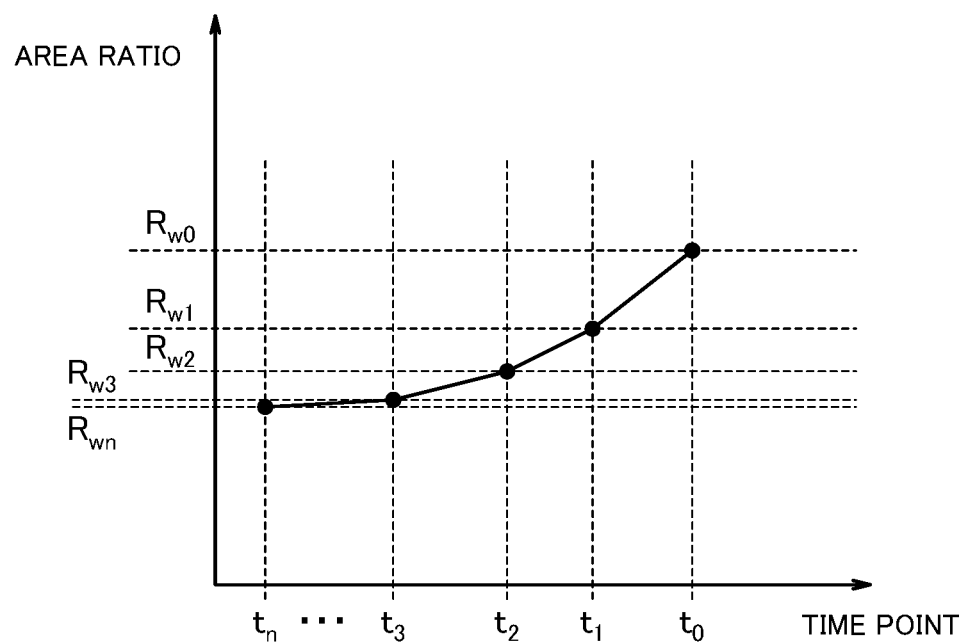
FIG. 7C is a diagram illustrating a third example of time transition of an area ratio (a water region/a determination target region).

A time transition property of the area ratio may be a characteristic vector constituted of time-series data of the area ratio. For example, it is assumed that as illustrated in FIG. 7C, area ratios at time points $t_n$ to $t_0$ are $R_{wn}$ to $R_{w0}$. In this case, a time transition property r is represented by the following equation (6).

$$r = (R_{w0}, R_{w1}, R_{w2}, R_{w3} \ldots, R_{wn}) \qquad \text{Equation (6)}$$

(d) The Case where Two or More Area Ratios are Held (Model Fitting)

Figure 7D:
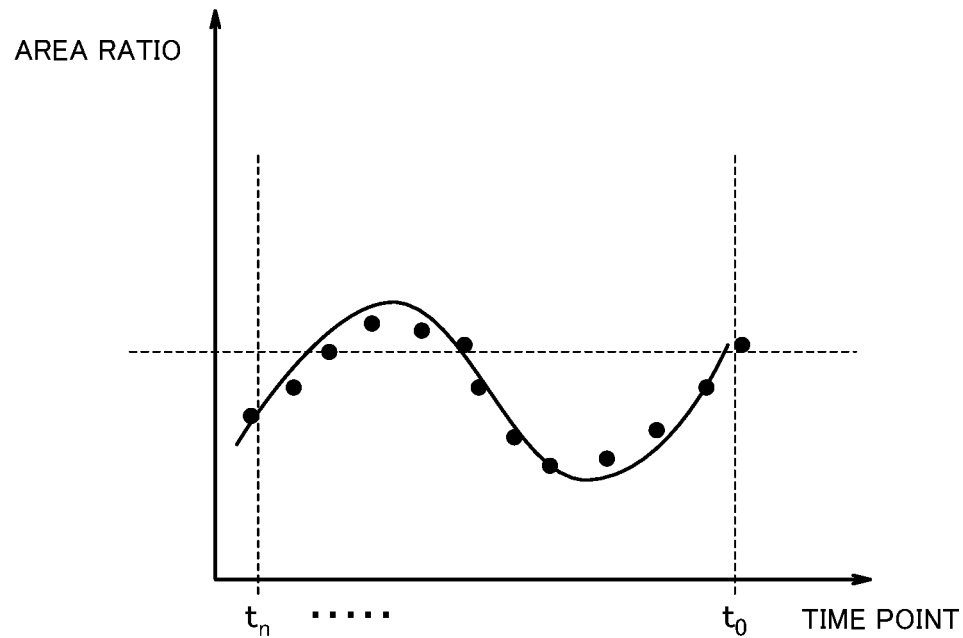
FIG. 7D is a diagram illustrating a fourth example of time transition of an area ratio (a water region/a determination target region)).

A time transition property of the area ratio may be an approximate function of time-series data of the area ratio. For example, this approximate function can be generated by fitting a preset model (a linear function, a trigonometric function, or the like) with the time-series data of the area ratio by using a least square error or the like. For example, when transition of the area ratio occurs in a period from time points to and to as illustrated in FIG. 7D, time change in area ratio is fitted with a sine function (or another function), and a time transition property F illustrated in FIG. 7D can be calculated.

(2-2) Property Comparing Unit 232

The property comparing unit 232 calculates a magnitude relation (difference) or a relative value (ratio) between a time transition property of the area ratio calculated by the time transition property calculating unit 231 (e.g., $a_1$ in the equation (4), a in the equation (5), or r in the equation (6)) and a predetermined threshold value of a time transition property. Thereby, the property comparing unit 232 calculates the risk level of flooding (i.e., a height of a possibility that a river floods). When the time transition property of the area ratio calculated by the time transition property calculating unit 231 is a characteristic vector indicated by the equation (5) or the equation (6), the threshold value of a time transition property is also a vector. In this case, the property comparing unit 232 compares a value of each component of the characteristic vector indicated by the equation (5) or the equation (6) with a value of each component of the vector representing threshold values of a time transition property.

The property comparing unit 232 previously holds information of predetermined reference value and threshold value of a time transition property that are criteria for determining the risk level. For example, the property comparing unit 232 may previously hold, as a reference value of a time transition property, a time transition property of the area ratio at normal time of a river. The property comparing unit 232 may hold, as the predetermined threshold of the area ratio, the area ratio for which the risk level of river flooding is empirically determined as being high.

For example, the reference value of a time transition property at normal time of a river may be:
(i) the increase amount of the area ratio in a unit time x in a section having a time length X;
(ii) vector characteristic amounts constituted of time-series data of the increase amount of the area ratio in a unit time x in a section having a time length X;
(iii) vector characteristic amounts constituted of time-series data of the area ratio acquired in a section having a time length X; or
(iv) an approximate function of time-series data of the area ratio acquired in a section having a time length X.

The property comparing unit 232 can calculate the risk level of flooding by using the following methods, for example. As noted in the above-described example embodiment, calculating the risk level of flooding includes not only calculating a numeric value itself representing the risk level, but also determining whether the risk level is high or low.
(a) The Case where One Area Ratio is Stored When a predetermined threshold value of a time transition property is THa1, the property comparing unit 232 may calculate the risk level of a river, based on a magnitude relation between the increase amount $a_1$ of the area ratio per unit time and the threshold value THa1. For example, the property comparing unit 232 may determine whether the risk level DR is high or low, in accordance with the following equation (7).

$$DR = \text{high (if } a_1 \geq THa1\text{)}$$

$$\text{low (if } a_1 \leq THa1\text{)} \quad \text{Equation (7)}$$

According to the equation (7), when the increase amount $a_1$ of the area ratio exceeds the threshold value THa1, a flow region of a river is rapidly expanding, and thus, the property comparing unit 232 determines that the risk level DR of river flooding is "high". In contrast, when the increase amount $a_1$ does not exceed the threshold value THa1, a flow region of the river is not rapidly expanding ($0 < a_1 \leq THa1$) or is returning into a normal state ("S1" in (a) and (b) in FIG. 2) ($a_1 < 0$), and thus, the property comparing unit 232 determines that the risk level of river flooding is "low".

Alternatively, the property comparing unit 232 may calculate the risk level DR of a river, based on a relative value (ratio) between a threshold value THa1 and the increase amount $a_1$. For example, the property comparing unit 232 may calculate the risk level DR in accordance with the following equation (8).

$$DR = a_1/THa1 \quad \text{Equation (8)}$$

According to the equation (8), the risk level DR indicates how large the increase amount $a_1$ of the area ratio is as compared with the threshold value THa1. As the increase amount $a_1$ of the area ratio is larger, the risk level DR is larger.

The property comparing unit 232 can also set a plurality of threshold values THa1, THa2, ..., and THan (THa1<THa2< ... <THan). In this case, the property comparing unit 232 makes comparison of a magnitude relation between the increase amount $a_1$ and each of the threshold values THa1, THa2, ..., and THan in accordance with the equation (7) or the equation (8). A plurality of the threshold values (THa1, THa2, ..., THan) do not need to be at a constant interval. A plurality of the threshold values may be arranged at coarse (wide) intervals in a range where the risk level of flooding is low, and meanwhile, may be arranged at fine (narrow) intervals in a range where the risk level of flooding is high. In this case, the property comparing unit 232 may calculate the risk level DR by using the following equation (9), for example.

$$DR = 0 \text{ (if } a_1 < THa1\text{)} \quad \text{Equation (9)}$$
$$1 \text{ (if } THa1 \leq a_1 < THa2\text{)}$$
$$\ldots$$
$$n-1 \text{ (if } THan-1 \leq a_1 < THan\text{)}$$
$$n \text{ (if } THan \leq a_1\text{)}$$

According to the equation (9), the property comparing unit 232 can calculate the risk level of river flooding in (n+1) stages, based on the magnitude relation between each of the threshold values THa1 to THan and the increase amount $a_1$.
(b) The Case where Two or More Area Ratios are Held (Transition of the Increase Amount)

The property comparing unit 232 may set, as a reference value of a time transition property, a characteristic vector A=(A1, A2, A3, ..., An) constituted of time-series data (assumed to be A1 to An) of the increase amount of the area ratio calculated by the time transition property calculating unit 231. In this case, the property comparing unit 232 may calculate the risk level DR by calculating an L1 norm (denoted by |A, a|) of a difference between a characteristic vector a=(a1, a2, a3, ..., An) represented by the equation (5) and the characteristic vector A=(A1, A2, A3, ..., An) as the reference values. For example, the property comparing unit 232 can compare, with the threshold value THb, an average value (|A, a|/n in the equation (10)) of absolute values of differences between the elements of the characteristic vector A and the elements of the characteristic vector a in accordance with the equation (10). Thereby, the property comparing unit 232 can determine whether or not the risk level DR of flooding is high or low.

$$DR = \text{high (if } |A,a|/n > THb\text{)}$$

$$\text{low (if } |A,a|/n \leq THb\text{)} \quad \text{Equation (10)}$$

According to the equation (10), when an average value of absolute values of differences between the elements of the time-series data A of the increase amount of the area ratio calculated by the time transition property calculation unit 231 and the elements of the time-series data a of the increase amount at normal time is larger than a threshold value THb, it can be determined that the risk level DR is "high".
(c) The Case where Two or More Area Ratios are Held (Transition of the Area Ratio)

A predetermined time transition property may be a characteristic vector R=(R0, R1, R2, R3, ..., Rn)) constituted of time-series data of the area ratio at normal time of a river. In this case, the property comparing unit 232 may make comparison of a magnitude relation between a threshold values THc and an L1 norm (denoted by R, r) of a difference between a characteristic vector $r=(R_{w0}, R_{w1}, R_{w2}, R_{w3}, \ldots, R_{wn})$ represented by the equation (6) and the characteristic vector $R=(R0, R1, R2, R3, \ldots, Rn)$, thereby calculating the risk level of flooding. For example, as expressed by the following equation (11), the property comparing unit 232 can compare, with the threshold value THc, a value acquired by dividing the L1 norm |R, r| by the number n of the elements of the characteristic vector R or r, thereby determining whether the risk level DR is high or low.

$$DR = \text{high (if } |R,r|/n > THc)$$

$$\text{low (if } |R,r|/n \leq THc \qquad \text{Equation (11)}$$

According to the equation (11), when a deviation between transition of the area ratio calculated by the time transition property calculating unit 231 and transition of the area ratio at normal time of a river is large, the property comparing unit 232 determines that the risk level of river flooding is "high".

(d) The Case where Two or More Area Ratios are Held (Model Fitting)

The property comparing unit 232 may use, as a predetermined reference value of time transition property of the area ratio, a reference approximate function Fd of approximating time-series data of the area ratio at normal time of a river. In this case, the property comparing unit 232 may compare, with the predetermined reference approximate function Fd, an approximation function F generated based on time series data of the area ratio calculated by the area ratio calculating unit 22, thereby calculating the risk level. A value acquired by integrating a product of the reference approximate function Fd and the approximate function F over time in which time-series data of the area ratio are defined, i.e., from a time point $t_n$ to a time point $t_0$ is assumed to be z. In this case, the property comparing unit 232 may determine whether the risk level DR is high or low, by the following equation (12), for example.

$$DR = \text{low (if } z > THz)$$

$$\text{high (if } z \leq THz) \qquad \text{Equation (12)}$$

According to the equation (12), when z is smaller than a predetermined threshold value THz, it is determined that the risk level DR of flooding is "high".

The property comparing unit 232 can combine the determination of whether the risk level DR is high or low described above in (b), (c), and (d), with the calculation of a numeric value representing the risk level DR described above in (a). Specifically, only when the increase amount $a_1$ of the area ratio exceeds the threshold value THa1 defined in (a), the property comparing unit 232 may determine the risk level is high or low, by any one of the methods (b), (c), and (d). Thereby, the property comparing unit 232 can calculate the risk level more efficiently. The reason is that when the increase amount $a_1$ of the area ratio at a time point $t_1$ is smaller than the threshold value THa1, it is considered that a river is not rising at present, or is in a process of returning to a normal water amount. For example, there is a possibility that before the time point $t_1$, the increase amount of the area ratio is large, but after the time point $t_1$, the area ratio hardly increase. In such a case, the property comparing unit 232 determines that the risk level of flooding is "low", without determining whether the risk level DR is high or low as described above in (b), (c), and (d).

Alternatively, the property comparing unit 232 may calculate the risk level of flooding in consideration of the area ratio at a time point t in addition to the calculation method of the risk level described above in (a) to (d). For example, when the area ratio Rw (the equation (1)) at a time point t is smaller than a predetermined reference value Tw, the property comparing unit 232 determines that the risk level DR is "low" or "0", regardless of the increase amount of the area ratio. Meanwhile, when the area ratio Rw at a time point t is larger than the reference value Tw, the property comparing unit 232 may calculate the risk level by using the method described above in (a) to (d).

(Description of Operation)

With reference to FIG. 8, the following describes operation of the river risk level determining device 2 according to the present example embodiment. FIG. 8 is a flowchart illustrating a flow of the operation of the river risk level determining device 2.

As illustrated in FIG. 8, position information of the determination target region for calculating the area ratio is input to the area ratio calculating unit 22 (step S21). Predetermined reference value and threshold value of a time transition property are set in the property comparing unit 232 (step S22). The position information of the determination target region, and the predetermined reference value and threshold value of a time transition property may be input or set by a user.

Next, image data of a frame at a time point t captured by the monitoring camera are input as the input image to the water region detecting unit 21 (step S23). The water region detecting unit 21 extracts the determination target region from the input image at the time point t by using the position information of the determination target region. Then, the water region detecting unit 21 detects a water region in the determination target region by using a discriminator that has previously learned discrimination between water and non-water (step S24). The water region detecting unit 21 outputs position information of the detected water region to the area ratio calculating unit 22.

Next, the area ratio calculating unit 22 calculates the area ratio (=an area of the water region/an area of the determination target region) from the position information of the determination target region and the position information of the water region detected by the water region detecting unit 21, and stores information of the calculated area ratio (step S25). Then, the area ratio calculating unit 22 outputs the information of the calculated area ratio to the time transition property calculating unit 231. The time transition property calculating unit 231 determines whether a plurality of area ratios calculated from input images at time points before the time point t are stored (S251). When a plurality of area ratios before the time point t are not stored (No at S251), the processing returns to the step S23. Meanwhile, when a plurality of area ratios before the time point t are stored (Yes at S251), the property comparing unit 232 calculates the risk level, based on a magnitude relation or a relative value between a predetermined time transition property and a calculated time transition property (step S26). The above-described steps S23 to S26 are repeated until image input is completed (Yes at S261).

(Description of Advantageous Effects)

According to the configuration of the present example embodiment, the risk level of river flooding (a numeric value indicating a height of a possibility of river flooding or an index representing whether a possibility thereof is high or low) is calculated based on a proportion (one example of the area ratio) of an area of an occupied region (one example of a water region) covered with water in relation to a specific region (one example of the determination target region) in a captured image (one example of the input image) of a river. For this reason, a height of a possibility of river flooding can be determined with high accuracy in a zone where a region having the same altitude is wide and change in water level between normal time and time of river rising is small.

Further, according to the configuration of the present example embodiment, the risk level is calculated in consideration of transition of the area ratio. Thereby, when the area ratio is rapidly increasing (i.e., a water region is spreading), it can be determined that the risk level is high. Meanwhile, when the increase amount of the area ratio is reduced or the area ratio becomes smaller, it can be determined that the risk level is small.

Third Example Embodiment

The river risk level determining device 3 according to the present example embodiment is implemented as hardware. Specifically, a control function of the river risk level determining device 3 is implemented by recording, in a computer-readable recording medium, a program for determining the risk level of a river, reading, into a computer, the program recorded in the recording medium, and executing the program. The control function of the river risk level determining device 3 may be the same as control functions of the river risk level determining devices 1 and 2 described above in the first and second example embodiments.

The computer includes an operating system (OS) and hardware such as a peripheral device. The computer-readable recording medium is a portable medium such as a flexible disk, a magneto-optical disk, a read only memory (ROM) and a compact disc (CD) ROM, and a storage device such as a hard disk incorporated in the computer. The program may be one for implementing a part of the above-described function, or may be one for implementing the above-described function in combination with a program already recorded in the computer.

(Hardware Configuration of River Risk Level Determining Device 3)

FIG. 9 is a block diagram illustrating a hardware configuration of the river risk level determining device 3 according to the present example embodiment. As illustrated in FIG. 9, the river risk level determining device 3 includes a central processing unit (CPU) 31, a random access memory (RAM) 32, a storage device 33, and an input-output device 34. The river risk level determining device 3 further includes a communication interface 35 for performing wireless or wired communication with an external device including the monitoring camera.

The control function of the river risk level determining device 3 is implemented by the CPU 31 executing the program read from the storage device 33 out to the RAM 32. Similarly, the control functions of the river risk level determining devices 1 and 2 described above in the first and second example embodiments are each implemented by a computer as well.

The input-output device 34 includes a device for inputting to and outputting from the computer. The input-output device 34 may include a user interface such as a keyboard, for example. With the input-output device 34, a user can input position information of the determination target region and the like. Alternatively, the input-output device 34 may include a display or a notifying device for notifying a risk of river flooding.

(Description of Advantageous Effects)

According to the configuration of the present example embodiment, the control function of the river risk level determining device as described above in the first example embodiment or the second example embodiment is implemented as hardware by the computer. For this reason, the river risk level determining device according to the present example embodiment is also capable of determining a height of a possibility of river flooding, with high accuracy.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. This application is based upon and claims the benefit of priority from Japanese patent application No. 2017-231933, filed on Dec. 1, 2017, the disclosure of which is incorporated herein in its entirety by reference.

INDUSTRIAL APPLICABILITY

The present invention can be used as a function of determining the risk level of river flooding by being incorporated in a river monitoring system installed at a river monitoring center or the like.

REFERENCE SIGNS LIST 1, 2, 3 River risk level determining device
11, 21 Water region detecting unit
12, 22 Area ratio calculating unit
13, 23 Risk level determining unit
231 Time transition property calculating unit

What is claimed is:

1. A river risk level determining device comprising:
a memory; and
at least one processor coupled to the memory,
the at least one processor performing operations to:
detect a water region covered with water, in a determination target region being set on an input image, the input image being a captured image of a river;
calculate an area ratio being a proportion of an area of the water region to the determination target region; and
calculate, based on the area ratio, a risk level indicating a height of a risk of flooding of the river.

2. The river risk level determining device according to claim 1, wherein the at least one processor further performs operations to:
discriminate each pixel included in the determination target region into a pixel related to water or a pixel related to non-water, by using a discriminator that previously learns in such a way as to discriminate a pixel into water or non-water, and
detect, as the water region, an aggregation of pixels discriminated into water by the discriminator.

3. The river risk level determining device according to claim 1, wherein the at least one processor further performs operations to:
determine the risk level, based on a magnitude relation or a relative value between the area ratio calculated and a preset threshold value of the area ratio.

4. The river risk level determining device according to claim 1, wherein the at least one processor further performs operations to:
  calculate an increase amount representing how large the area ratio calculated is as compared with a predetermined reference value, and determine the risk level, based on a magnitude relation or a relative value between the increase amount of the area ratio and a preset threshold value of an area ratio.

5. The river risk level determining device according to claim 1, wherein the at least one processor further performs operations to:
  calculate a time transition property being a numeric value representing magnitude of time change of the area ratio, and calculate, as the risk level, a magnitude relation or a relative value between the time transition property and a threshold value of the time transition property.

6. The river risk level determining device according to claim 5, wherein the at least one processor further performs operations to:
  the time transition property is any one of:
  (i) an increase amount of the area ratio per unit time to be calculated from area ratios calculated from two input images with different input time points;
  (ii) a vector constituted of time-series data of the increase amount of the area ratio per unit time to be calculated from area ratios calculated from two input images with different input time points;
  (iii) a vector constituted of time-series data of area ratios calculated from a plurality of input images with different input time points; and
  (iv) a function calculated by approximating the time series data of area ratios calculated from a plurality of input images with different input time points.

7. A river risk level determining method comprising:
by at least one processor,
detecting a water region covered with water, in a determination target region being set on an input image, the input image being a captured image of a river;
calculating an area ratio being a proportion of an area of the water region to the determination target region; and
calculating, based on the area ratio, a risk level indicating a height of a risk of flooding of the river.

8. A non-transitory computer-readable storage medium that stores a program for causing a computer to execute:
detecting a water region covered with water, in a determination target region being set on an input image, the input image being a captured image of a river;
calculating an area ratio being a proportion of an area of the water region to the determination target region; and
calculating, based on the area ratio, a risk level indicating a height of a risk of flooding of the river.

* * * * *